Feb. 23, 1971  S. KWASIBORSKI, JR  3,564,880

DOOR LATCH CONTROL MECHANISM

Filed Aug. 27, 1969  2 Sheets-Sheet 1

INVENTOR.
Stanley Kwasiborski, Jr.
BY
Arthur H Krein
ATTORNEY

United States Patent Office 3,564,880
Patented Feb. 23, 1971

3,564,880
DOOR LATCH CONTROL MECHANISM
Stanley Kwasiborski, Jr., Hazel Park, Mich., assignor to General Motors Corporation, Detroit, Mich., a corporation of Delaware
Filed Aug. 27, 1969, Ser. No. 853,454
Int. Cl. B60r 18/04, 25/04
U.S. Cl. 70—255                    5 Claims

ABSTRACT OF THE DISCLOSURE

A door latch control mechanism for use on a vehicle door provided with a conventional type closure latch having a latch bolt and detent adapted for automatic undogging and keyless locking and provided with a coupling between the detent and an outside latch operating means, the control mechanism including a pivotal cover for an ignition switch key cylinder lock assembly, the cover being connected by a linkage system to a block-out lever for moving the block-out lever into and out of blocking engagement with the coupling of the closure latch mechanism.

---

This invention relates to a door latch control mechanism, particularly for use in the door on the driver's side of a motor vehicle.

As is well known, it is possible in vehicle door locking systems for the driver to leave the vehicle and lock the door with the key still in the ignition switch key cylinder lock of the vehicle. In modern vehicles, the same key is generally employed both for the ignition switch and for the door lock and, when the ignition key is locked in the vehicle, the driver is then in a position of not having a key to open the doors of the vehicle.

It is, therefore, the primary object of this invention to improve a door latch assembly whereby the door locking system is inoperative if the key is left in the ignition switch key cylinder lock assembly.

Another object of this invention is to improve door latch control mechanisms whereby undogging of the closure latch is automatically effected in the event that a key is left in the ignition switch key cylinder lock assembly of the vehicle.

In the preferred embodiment of the door latch control mechanism of the invention, a lock cover for the door mounted ignition switch of a motor vehicle is coaxially mounted with a lever and resiliency coupled thereto by a spring. The lever is connected to a block-out lever pivotally mounted to the frame of the closure latch of the door for movement into and out of blocking engagement with the coupling means between the detent and the outside operating means of the closure latch as the lock cover is moved to uncover and cover the ignition switch respectively.

For a better understanding of the invention as well as other objects and further features thereof, references is had to the following detailed description of the invention to be read in connection with the accompanying drawings, wherein.

Figure 1:
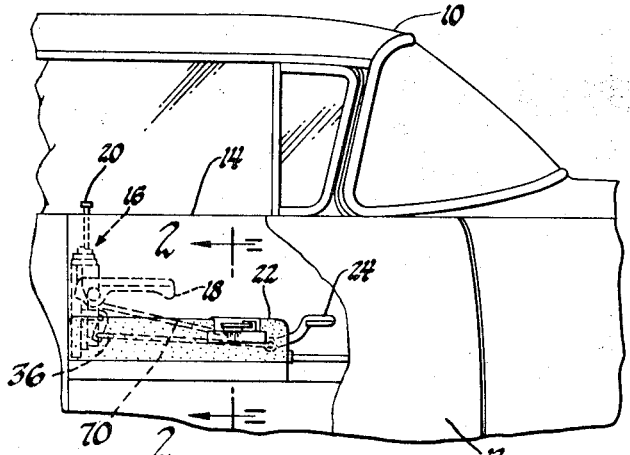
FIG. 1 is a partial side elevational view of a vehicle body embodying a door latch control mechanism according to this invention.

Referring now to FIG. 1 of the drawings, a vehicle body 10 includes a passenger door 12 and an operator door 14, both swingably mounted adjacent to their forward edge on the vehicle body for movement between a closed position, as shown, and an open position, not shown. Door 14 is held in closed position by a closure latch 16. Mounted on the outside of the door 14 is a fixed handle 18 including a conventional push button operating means, not shown, and also mounted on the outside of the door 14 is a conventional key lock cylinder, not shown, for placing the closure latch 16 in either locked or unlocked condition. In addition, inside garnish button 20 is positioned on the door and an arm rest 22 is mounted on the inside of door 14 and has extending from one thereof an inside remote latch operating handle 24.

Figure 4:
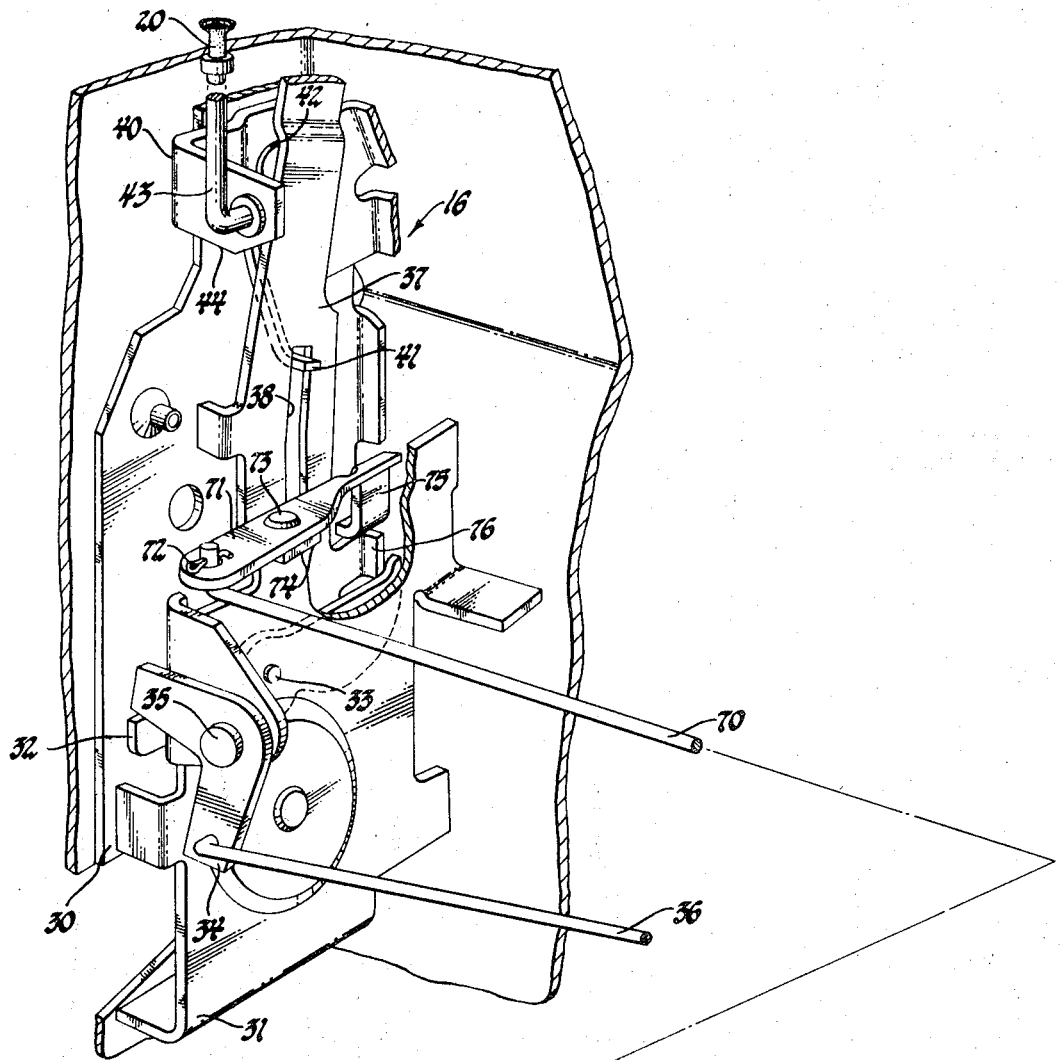
FIG. 4 is a perspective view of the door latch control mechanism with parts broken away to show details of the structure.
Figure 4:
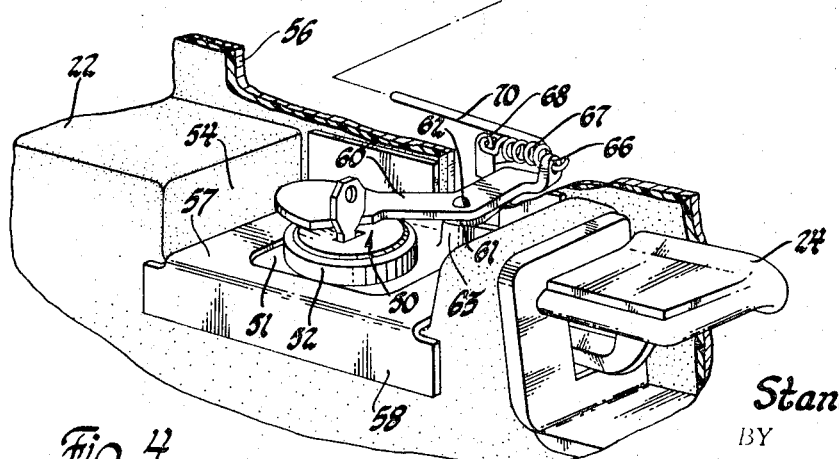

Referring now particularly to FIG. 4, the closure latch 16 is of a conventional type, for example, of the type disclosed in United States Patent 3,190,682 issued on June 22, 1965, to Robert M. Fox and Edwin H. Klove, Jr., having a movable latch bolt and detent means releasably holding the latch bolt in a latched position and operating means for releasing the detent means either from the inside of the vehicle or from the outside of the vehicle. Since the closure latch itself is conventional and forms no part of the instant invention, a detailed illustration and description of the closure latch is not deemed necessary. Accordingly, only portions of the closure latch, of the type disclosed in the above identified United States Patent 3,190,682, has been shown in FIG. 4.

As shown, the closure latch 16 includes frame plates 30 and 31 suitably secured together so that the main body portion of these frame plates are in spaced relation to each other for supporting the remaining elements of the closure latch. A conventional latch bolt, not shown, is held in a latched position by a detent 32 swingably mounted on a pivot shaft 33. The detent 32 is pivoted to release the latch bolt by means of an inside operating lever 34 pivotally secured by pivot pin 35 to a lateral leg of frame plate 31 and is caused to pivot in a counterclockwise direction, as shown in FIG. 4, by means of a link rod 36 suitably coupled to the inside operating handle 24.

Release of the detent 32 is also effected by means of a coupling or intermittent lever 37, hereinafter referred to as an intermittent lever, which is suitably coupled at one end to an outside operating lever, not shown, actuated by a conventional push button operating means, not shown. The intermittent lever 37 is guided for shifting movement and also located with respect to the detent 32 by means of a closed elongated slot 38 therein receiving a lateral tab 41 of a locking lever 40 which is pivotally mounted at 42 on frame plate 30.

The locking lever 40 is movable between an unlocked position, as shown in FIG. 4, and a locked position slightly counterclockwise from the position shown by either the outside key lock cylinder, not shown, or the inside garnish button 20 which is coupled by a conventional vertically shiftable rod 43 to a lateral tab 44 of the locking lever 40. It is, of course, understood that the outside key lock cylinder is also suitably coupled to the locking lever. In addition, the locking lever 40 is held in either its locked or unlocked position by a coil-type over-center spring, not shown.

As is well known, this type of closure latch also includes the features of automatic undogging and keyless locking. In the automatic undogging sequence of operation, if the garnish button or the key lock cylinder, not shown, is operated to shift the locking lever 40 into its locked position, and then the door is closed without depressing the conventional push button operating means, not shown, on the exterior of the door, the detent 32 will be intermittently actuated by the latch bolt, pivoting the detent 32 in a counterclockwise direction as seen in FIG. 4 whereby a shoulder, not shown, of the detent will engage the intermittent lever 37 to swing it clockwise or to the left as seen in the same figure and thereby swing the locking lever 40 clockwise from its locked position to its unlocked position by engagement with tab 41 on the locking lever 40 in the slot 38 of intermittent lever 37.

Keyless locking is accomplished in the same manner as automatic undogging, just described, except that the push button operating means, not shown, is depressed and held during closing of the door to shift the intermittent lever 37 to a position upwardly and to the right of the position shown in FIG. 4 and hold the locking lever 40 in the former position as the door is closed so that the detent 32 cannot engage the intermittent lever 37 to return the locking lever to its unlocked position.

It is believed that the above description of the closure latch is sufficient for the purposes of this disclosure. For further details regarding the closure latch structure, reference is made to the above referenced United States Patent 3,190,682.

Figure 2:
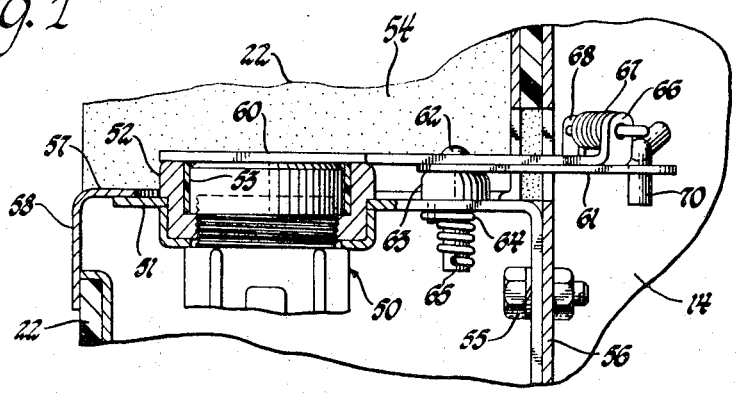
FIG. 2 is a sectional view taken along line 2—2 of FIG. 1.
Figure 3:
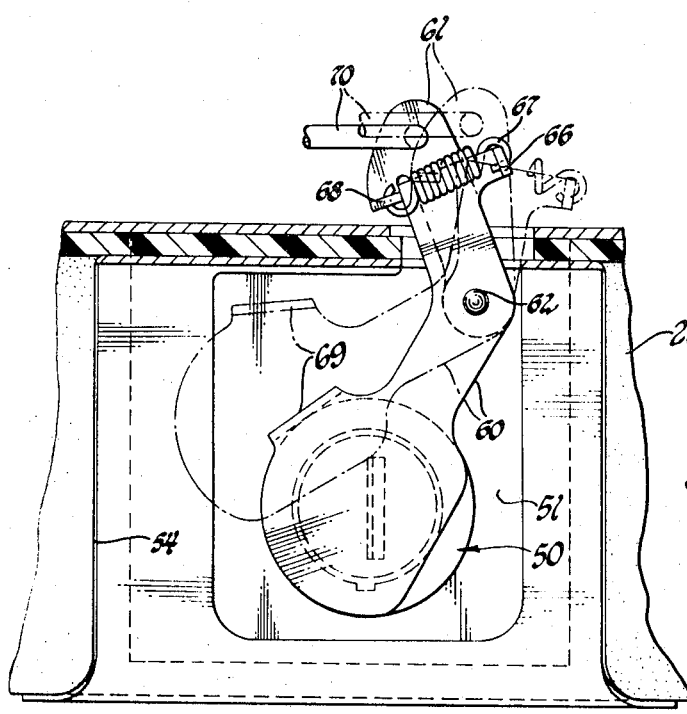
FIG. 3 is a top view of the ignition switch key cylinder lock and cover assembly.

Referring now to FIGS. 2, 3 and 4, a conventional ignition switch key cylinder lock assembly 50 is secured to a mounting 51 by threaded retainer 52 and annular ring 53, this assembly being fastened within a recessed portion 54 of arm rest 22 with a depending leg of the mounting plate 51 secured as by bolts 55 to the panel 56 of door 14. A trim plate 57 partially covers the mounting plate and has its depending leg portion 58 aligned with the inner face of the arm rest 22.

A lock cover 60 and lever 61 are pivotally secured by headed pivot pin 62 to the raised boss 63 of mounting plate 51. The headed pivot pin 62 is resiliently positioned by spring 64 encircling the lower portion of the headed pivot pin 62 with one end of the spring secured to an inlet tab of mounting plate 51 and the other end of the spring secured in an aperture 65 in headed pivot pin 62. The lock cover 60 is thus pivotally secured intermediate its ends so that one end thereof is movable between a position in which it covers the key hole of the ignition switch key cylinder lock assembly 50 as shown in FIG. 3 to a second position, shown by broken lines in the same figure, in which the key hole is uncovered to permit insertion of a key in the ignition switch key cylinder lock assembly. At its opposite end, the lock cover 60 is provided with an upturned apertured tab 66 to which one end of spring 67 is attached. The opposite end of the spring is connected to an upturned apertured tab 68 of lever 61 whereby when the lock cover 60 is in the position shown by the broken lines in FIG. 3, the lever 61 is biased clockwise to the position shown by the broken lines in the same figure. In addition, movement of the lock cover 60 in a counterclockwise direction is limited by engagement of depending leg 69 of the lock cover 60 with retainer 52.

The free end of lever 61 is apertured to receive one end of rod 70 which is pivotally connected at its opposite end to one end of block-out lever 71 and secured thereto by cotter pin 72 extending through the apertured upturned portion of rod 70. Intermediate its end, the block-out lever 71 is pivotally secured by pivot pin 73 to the lateral tab 74 of frame plate 31 of the closure latch assembly. At its opposite end, the block-out lever 71 is provided with a depending tab 75 engageable with a lateral tab 76 of intermittent lever 37 to prevent upward movement of the intermittent lever 37.

As can be seen in FIG. 4, when the lock cover 60 is moved clockwise to the position shown to uncover the ignition switch key cylinder lock assembly 50 for insertion of a key therein, the opposite end of the lock cover will be moved relative to lever 61 and through the biasing action of spring 67 cause lever 61 to pivot in the same direction, the block-out lever 71 will then be moved via rod 70 counterclockwise to the position shown with the depending tab 75 thereof in position to block the upward travel of intermittent lever 37. As previously described, intermittent lever 37 must be moved to a position upwardly and to the right of the position shown to effect keyless locking and, by blocking this movement, keyless locking is prevented until such time as the key is removed from the ignition switch key cylinder lock assembly. Thus, a person cannot lock himself out of the car since leaving the key in the ignition switch will prevent keyless locking. However, when the key is removed, and the lock cover 60 is moved to cover the ignition switch key cylinder lock assembly, lock cover 60 will engage tab 68 of lever 61 to pivot it counterclockwise as seen in FIG. 3 to in turn cause the blocking lever 71 to pivot clockwise from the position shown in FIG. 4 to move the depending tab 75 thereon out of the path of travel of tab 76 on intermittent lever 37 thus permitting keyless locking to be accomplished.

While the invention has been described with reference to the structure disclosed herein, it is not confined to the details set forth, and this application is intended to cover such modifications or changes as may come within the purposes of the improvements or the scope of the following claims.

What is claimed is:

1. A door latch control mechanism for use on a vehicle door provided with a closure latch including a lock frame, a detent swingably mounted on the frame for movement between holding and release positions with respect to a bolt mounted on the lock frame for movement between latched and unlatched position, an outside operating means for the closure latch, coupling means movably positioned to couple the detent to the outside operating means, and a vehicle ignition switch mounted on the door, the combination comprising, blocking means mounted on said frame for movement from a first position in blocking engagement with said coupling means to a second position out of blocking engagement with said coupling means, a cover means mounted adjacent said ignition switch for movement from a first position covering said ignition switch to a second position in which said ignition switch is uncovered, and connector means connecting said cover means to said blocking means whereby when said cover means is in said second position to uncover said ignition switch, said blocking means is in said first position to block actuation of said coupling means.

2. A door latch control mechanism according to claim 1 wherein said connector means includes a lever pivotally mounted adjacent said ignition switch, rod means pivotally connecting said lever to said blocking means and connector means connecting said lever to said cover means whereby said lever is moved relative to said cover means as said cover means is moved from said second position to said first position.

3. A door latch control mechanism according to claim 2 wherein said cover means is a lock cover pivotally mounted intermediate its end coaxially with said lever, said lock cover being positioned to engage said lever when moved from said second position to said first position and spring means interconnecting said lock cover and said lever to effect movement of said lever toward said lock cover when said lock cover is moved from said first position to said second position.

4. In combination with an automobile door and a key controlled ignition switch for the automobile, a closure latch mounted on said door, said closure latch including a lock frame, a latch bolt swingably mounted on said frame, a detent swingably mounted on the frame for movement between holding and released positions with respect to said latch bolt, an outside operating means on said door and coupling means movably positioned to couple said outside operating means to said detent, blocking means mounted on said frame for movement from a first position in blocking engagement with said coupling means to a second position out of blocking engagement with said coupling means, cover means mounted adjacent said ignition switch for movement from a first position covering said ignition switch to a second position in which said ignition switch is uncovered, and connector means connecting said cover means to said blocking means whereby when said cover means is in said second position to uncover said ignition switch, said blocking means is in said first position to block actuation of said coupling means.

5. The combination according to claim 4 wherein said connector means includes a lever pivotally mounted adjacent said ignition switch, rod means connecting said lever to said blocking means, spring means connected to said lever and said cover means to normally bias said lever into engagement with said cover means, said lever being positioned to be engaged and pivoted by said cover means as the said cover means is moved from said second position to said first position.

References Cited

UNITED STATES PATENTS

| | | | |
|---|---|---|---|
| 2,136,677 | 11/1938 | Doeppel | 70—455X |
| 2,247,249 | 6/1941 | Morton | 70—455 |
| 2,796,755 | 6/1957 | Craig | 70—255X |
| 3,190,682 | 6/1965 | Fox et al. | 292—216 |

MARVIN A. CHAMPION, Primary Examiner

A. G. CRAIG, Jr., Assistant Examiner

U.S. Cl. X.R.

70—455